United States Patent
Harai

(10) Patent No.: US 10,705,630 B2
(45) Date of Patent: Jul. 7, 2020

(54) CONTROL METHOD, INFORMATION PROCESSING APPARATUS, AND NON-TRANSITORY COMPUTER-READABLE STORAGE MEDIUM FOR STORING PROGRAM

(71) Applicant: FUJITSU LIMITED, Kawasaki-shi, Kanagawa (JP)

(72) Inventor: Natsuki Harai, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/269,920

(22) Filed: Feb. 7, 2019

(65) Prior Publication Data

US 2019/0286250 A1  Sep. 19, 2019

(30) Foreign Application Priority Data

Mar. 14, 2018  (JP) .................. 2018-046243

(51) Int. Cl.
| | |
|---|---|
| G06F 3/046 | (2006.01) |
| G06F 3/038 | (2013.01) |
| G06T 7/70 | (2017.01) |
| G06F 3/0354 | (2013.01) |
| G06F 3/042 | (2006.01) |

(52) U.S. Cl.
CPC .......... G06F 3/038 (2013.01); G06F 3/03542 (2013.01); G06F 3/0425 (2013.01); G06T 7/70 (2017.01); *G06F 2203/0384* (2013.01); *G06T 2207/10048* (2013.01)

(58) Field of Classification Search
CPC .... G06F 3/038; G06F 3/0425; G06F 3/03542; G06F 2203/0384; G06F 3/04162; G06F 3/0416; G06F 3/046; G06F 2203/04106; G06F 3/03545; G06T 7/70; G06T 2207/10048

See application file for complete search history.

(56) References Cited

U.S. PATENT DOCUMENTS

| | | | | |
|---|---|---|---|---|
| 2012/0274583 A1* | 11/2012 | Haggerty | .............. | G06F 3/0488 345/173 |
| 2015/0091859 A1* | 4/2015 | Rosenberg | .............. | G06F 3/044 345/174 |

FOREIGN PATENT DOCUMENTS

JP    2016-184268    10/2016

* cited by examiner

*Primary Examiner* — Lunyi Lao
*Assistant Examiner* — Jarurat Suteerawongsa
(74) *Attorney, Agent, or Firm* — Fujitsu Patent Center

(57) ABSTRACT

A control method of a computer includes: obtaining an image captured by an imaging device configured to make a pointing device to be in the image; identifying a first position corresponding to the pointing device based on the obtained image; obtaining radio wave reception information that indicates a reception state, by the wireless communication apparatus or the wireless communication device, of a radio wave transmitted and received between a wireless communication apparatus and a wireless communication device of the pointing device, wireless communication apparatus information that identifies the wireless communication apparatus, and device information that identifies the pointing device; estimating a second position corresponding the pointing device based on the obtained radio wave reception information and wireless communication apparatus information; and storing the obtained device information in association with the identified position when a matching degree between the first position and the second position satisfies a condition.

15 Claims, 19 Drawing Sheets

FIG. 6

| DATE AND TIME | DEVICE INFORMATION | WIRELESS COMMUNICATION APPARATUS INFORMATION | RADIO WAVE INTENSITY |
|---|---|---|---|
| 02/10/2018 20:01:11.15 | pd1 | ap1 | -41dBm |
| 02/10/2018 20:01:11.15 | pd1 | ap2 | -7dBm |
| 02/10/2018 20:01:11.15 | pd1 | ap3 | -15dBm |
| ... | ... | ... | ... |

| RANGE OF RADIO WAVE INTENSITY | RANGE OF DISTANCE |
|---|---|
| **(dBm) ~ **(dBm) | (m)~(m) |
| **(dBm) ~ **(dBm) | (m)~(m) |
| **(dBm) ~ **(dBm) | (m)~(m) |
| ... | ... |

| AP IDENTIFICATION INFORMATION | AP POSITION |
|---|---|
| ap1 | (x1, y1) |
| ap2 | (x2, y2) |
| ... | ... |

| OBJECT INFORMATION | DEVICE INFORMATION | USER INFORMATION | OPERATION DATE AND TIME | OPERATION POSITION | OPERATION TYPE | OPERATION CONTENTS |
|---|---|---|---|---|---|---|
| Obj1 | pd1 | user1 | 02/23/2018 01:23:45.67 | (x, y) | NEWLY CREATE A LABEL OBJECT | NEWLY CREATE AT COORDINATES (x, y) |
| Obj2 | pd2 | user2 | 02/23/2018 01:24:56.78 | {(x, y), (x, y), ...} | MOVE THE LABEL OBJECT | MOVE THE OBJECT |
| ... | ... | ... | ... | ... | ... | ... |

| DEVICE INFORMATION | USER INFORMATION |
|---|---|
| pd1 | user1 |
| pd2 | user2 |
| ... | ... |

| DATE AND TIME | DEVICE INFORMATION | WIRELESS COMMUNICATION APPARATUS INFORMATION | RADIO WAVE INTENSITY |
|---|---|---|---|
| 02/10/2018 20:01:11.15 | pd1 | ap1 | -41dBm |
| 02/10/2018 20:01:11.15 | pd1 | ap2 | -7dBm |
| 02/10/2018 20:01:11.15 | pd1 | ap3 | -15dBm |
| 02/10/2018 20:18:11.42 | pd2 | ap1 | -31dBm |
| 02/10/2018 20:18:11.42 | pd2 | ap2 | -27dBm |
| 02/10/2018 20:18:11.42 | pd2 | ap3 | -15dBm |
| ... | ... | ... | ... |

| DATE AND TIME | OPERATION IDENTIFICATION INFORMATION | COORDINATES |
|---|---|---|
| 02/10/2018 20:01:11.15 | m1 | (x,y) |
| 02/10/2018 20:01:11.15 | m1 | (x,y) |
| 02/10/2018 20:01:12.15 | m1 | (x,y) |
| 02/10/2018 20:01:12.15 | m1 | (x,y) |
| 02/10/2018 20:18:11.42 | m2 | (x,y) |
| 02/10/2018 20:18:11.92 | m2 | (x,y) |
| ... | ... | ... |

1500

CONTROL METHOD, INFORMATION PROCESSING APPARATUS, AND NON-TRANSITORY COMPUTER-READABLE STORAGE MEDIUM FOR STORING PROGRAM

CROSS-REFERENCE TO RELATED APPLICATION

This application is based upon and claims the benefit of priority of the prior Japanese Patent Application No. 2018-46243, filed on Mar. 14, 2018, the entire contents of which are incorporated herein by reference.

FIELD

The embodiments discussed herein are related to a control method, an information processing apparatus, and a non-transitory computer-readable storage medium for storing a program.

BACKGROUND

In recent years, with the widespread use of projectors and large-sized displays, it becomes possible to use all over the place in a space as a display unit. For example, the display screen of a terminal, such as a smartphone, a tablet terminal, or the like that is brought in by a user is displayed onto the display unit at that site, and the screen is being shared among multiple persons.

Further, a conference, a brain storming session, or the like is being conducted while an object displayed by a display device, such as a projector, or the like onto a large-sized screen is being shared among a plurality of users, and freely moved and operated. An object may be information to be displayed on a display screen and includes information, for example, text, images, icons, labels, notes, or the like and may receive operation by a user, such as movement, changes in the direction and the size, deletion, editing, or the like.

Input of such operation is carried out by using, for example, a pointing device. For example, when an infrared pen that projects infrared light is used as an pointing device, the locus of a light spot drawn by the light projected by the infrared pen may be captured by an imaging device, such as a camera that keeps the display screen within the angle of view, or the like, and may be input.

A related-art technique is disclosed in Japanese Laid-open Patent Publication No. 2016-184268.

SUMMARY

According to an aspect of the embodiments, a control method of a computer includes: executing a first obtaining process that includes obtaining an image captured by an imaging device, the imaging device being configured to make a pointing device to be in the image; executing a identifying process that includes identifying a first position corresponding to the pointing device based on the obtained image; executing a second obtaining process that includes obtaining radio wave reception information that indicates a reception state, by the wireless communication apparatus or the wireless communication device, of a radio wave transmitted and received between a wireless communication apparatus and a wireless communication device of the pointing device, wireless communication apparatus information that identifies the wireless communication apparatus, and device information that identifies the pointing device; executing an estimating process that includes estimating a second position corresponding the pointing device based on the obtained radio wave reception information and wireless communication apparatus information; and executing a storing process that includes storing the obtained device information in association with the identified position when a matching degree between the first position and the second position satisfies a condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of radio wave reception state information according to the embodiment;
FIG. 7 illustrates an example of intensity and distance range information according to the embodiment;
FIG. 8 illustrates an example of setting position information according to the embodiment;
FIG. 11 illustrates an example of operation history information according to the embodiment;
FIG. 12 illustrates an example of user information according to the embodiment;
FIG. 14 illustrates an example of reception state history information of a pointing device according to the embodiment;
FIG. 15 illustrates an example of indication position history information according to the embodiment.

DESCRIPTION OF EMBODIMENTS

However, for example, when a display screen is shared by a plurality of users, and an input operation is performed by a plurality of pointing devices, it is sometimes desirable that the pointing device which has performed the input operation be identified.

According to an embodiment of the present disclosure, it is desirable to provide a technique capable of associating an input operation with a pointing device that has performed the input operation.

In the following, detailed descriptions will be given of some embodiments of the present disclosure with reference to the drawings. In a plurality of the drawings, a same sign is given to a corresponding component.

Figure 1:
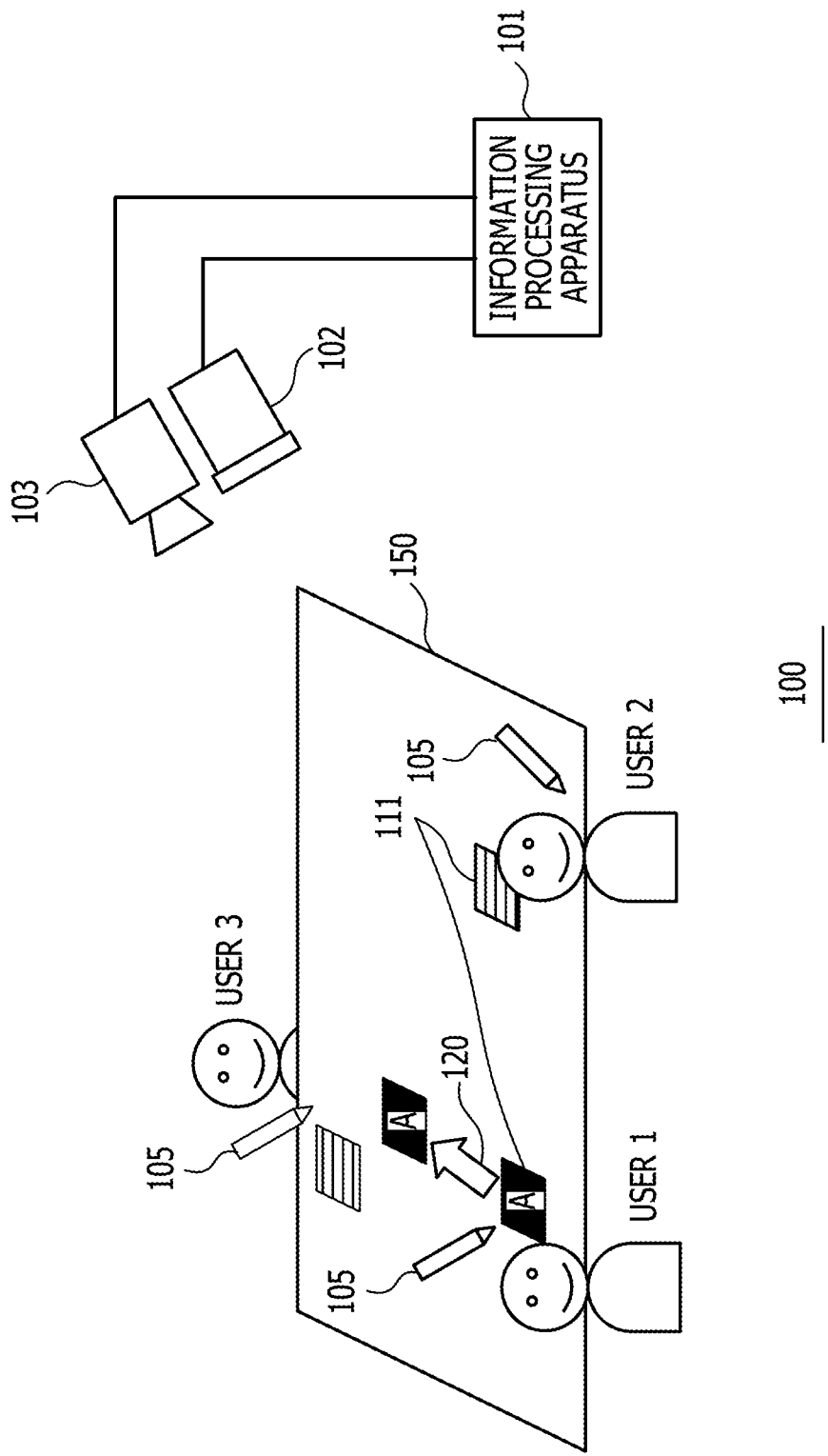
FIG. 1 illustrates an example of an input system.

FIG. 1 illustrates an example of an input system 100. The input system 100 includes, for example, an information processing apparatus 101, a display device 102, an imaging device 103, and pointing devices 105. For example, the display device 102 may display an object 111 on the display surface 150, such as a desk, a wall, or the like in accordance with an instruction from the information processing apparatus 101. Users are using pointing devices 105. In the example in FIG. 1, three users from a user 1 to a user 3 are illustrated, and the users use the respective pointing devices 105. The users are capable of input operations onto the object 111 using the respective pointing devices 105. If the pointing devices 105 are, for example, infrared pens, and the imaging device 103 is an infrared light camera, operations may be input as illustrated in FIG. 2.

Figure 2:
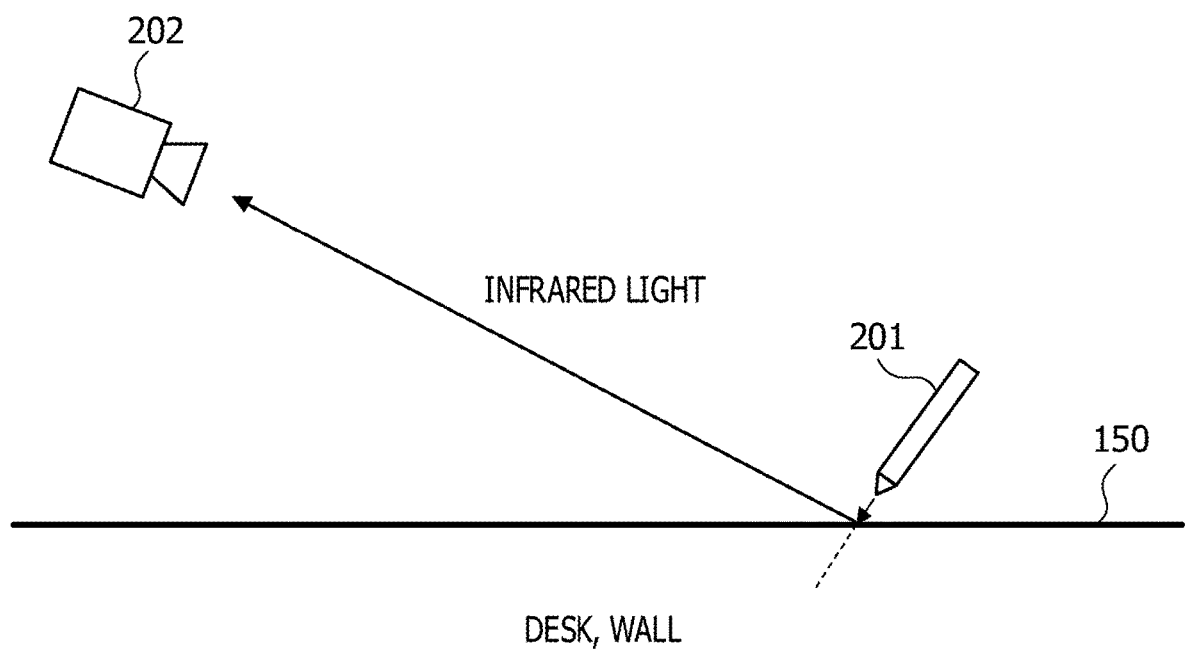
FIG. 2 illustrates an example of input of operation.

FIG. 2 illustrates an example of input to operation in the case where an infrared pen 201 is used as an example of the pointing device 105, and an infrared light camera 202 is used as the imaging device 103. As illustrated in FIG. 2, for example, when a user presses a switch, or the like included in the infrared pen 201 at the time of input, infrared light is projected from a pen point. The light projected by the infrared pen 201 is reflected on the display surface 150 and is detected by the infrared light camera 202. The information processing apparatus 101 may receive the input operation from the user by detecting the input of the locus of a light spot drawn by the infrared pen 201 using the infrared light camera 202.

In FIG. 1, for example, it is assumed that the user 1 selects an object A by the pointing device 105 and inputs an operation to move the object A in the direction illustrated by an arrow 120. In this case, the input operation by the pointing device 105 is detected by the imaging device 103, and the object A is moved. However, when an input operation is performed using the pointing device 105, it is sometimes not possible to identify which pointing device 105 has performed the input operation on the object 111 among the plurality of pointing devices 105. As a result, it is sometimes difficult to identify who is the user that has performed an operation 110 on the object. Accordingly, it is desirable to provide a technique that enables association of an input operation with a pointing device that has performed the input operation. In the following embodiment, for example, a technique is provided that makes it possible to associate an input operation with a pointing device that has performed the input operation.

Figure 3:
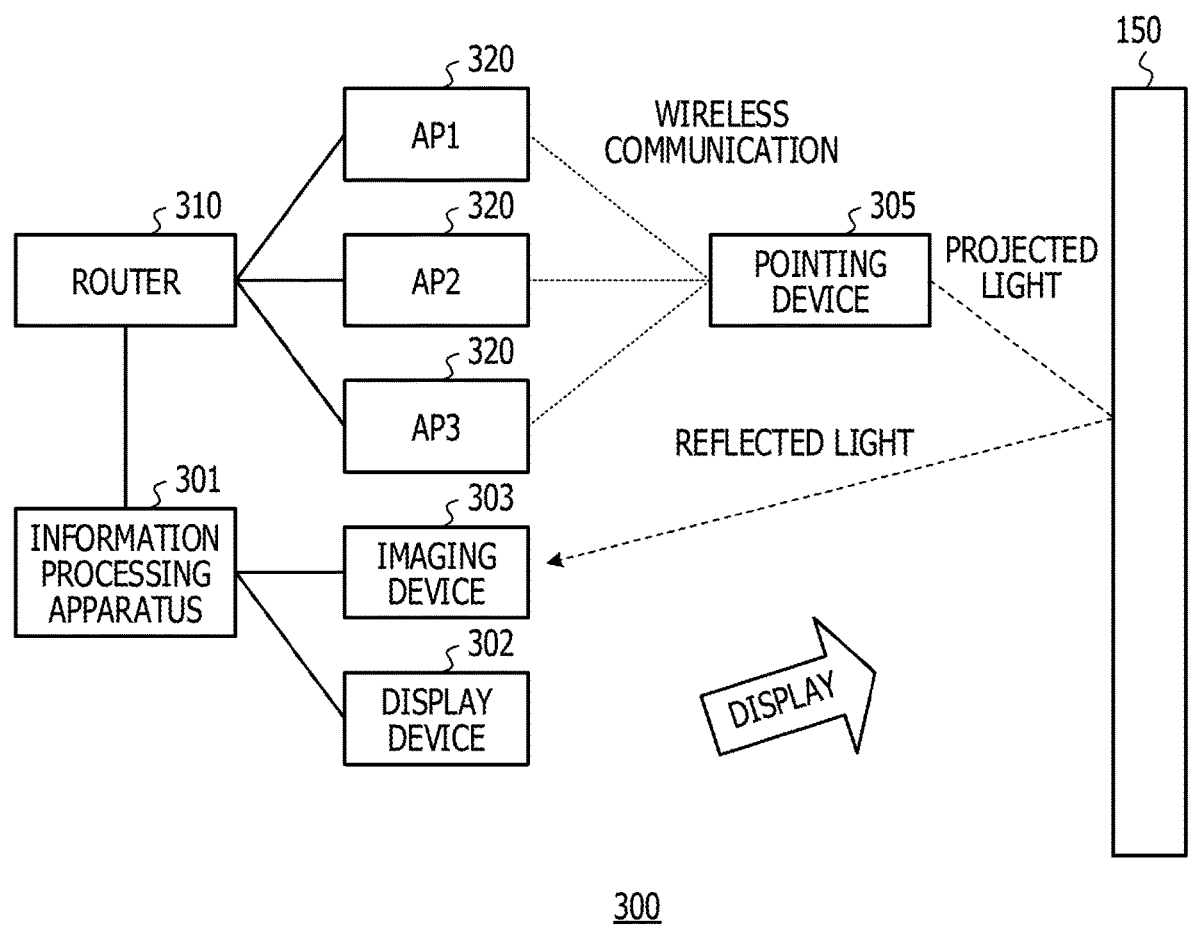
FIG. 3 illustrates an example of input system according to an embodiment.

FIG. 3 illustrates an example of an input system 300 according to an embodiment. The input system 300 may be, for example, a system that displays a screen onto a desk, a wall, or the like in a space and that receives input from a user. As an example of the input system 300, a technique called a space UI is known. The input system 300 according to the embodiment includes, for example, an information processing apparatus 301, a display device 302, an imaging device 303, and a pointing device 305. The input system 300 according to the embodiment includes a router 310 and access points (AP) 320. The input system 300 may include a plurality of access points 320 and includes three access points 320, AP1 to AP3, in the example in FIG. 3.

The information processing apparatus 301 may be a device, for example, a server, a personal computer (PC), a note PC, a tablet terminal, or the like. The display device 302 is a device, for example, a projector, or the like and displays the object 111 on the display surface 150 in accordance with an instruction of the information processing device 301. The pointing device 305 may be, for example, a device that emits light, such as an infrared pen. The user may, for example, draw a locus of a light spot on the display surface 150 by the light emitted from the pointing device 305 and may input an operation on the object 111. The imaging device 303 captures an image that contains the display surface 150 within the angle of view, for example. The image captured by the imaging device 303 may include the pointing device 305 and the reflected light from the display surface 150 of the light emitted from the pointing device 305. The pointing device 305 and the imaging device 303 may be combined so as to enable the imaging device 303 to detect input by the pointing device 305. For example, if the pointing device 305 is an infrared pen, the imaging device 303 may be an infrared light camera. The imaging device 303, for example, outputs a captured image to the information processing apparatus 301. The information processing apparatus 301 may operate the object 111 displayed on the display surface 150 based on, for example, the locus of a light spot caught in the image captured by the imaging device 303.

The router 310 is a communication device that relays communication, for example, between the access point 320 and the information processing apparatus 301. The access point 320 performs, for example, wireless communication with the pointing device 305.

Figure 4:
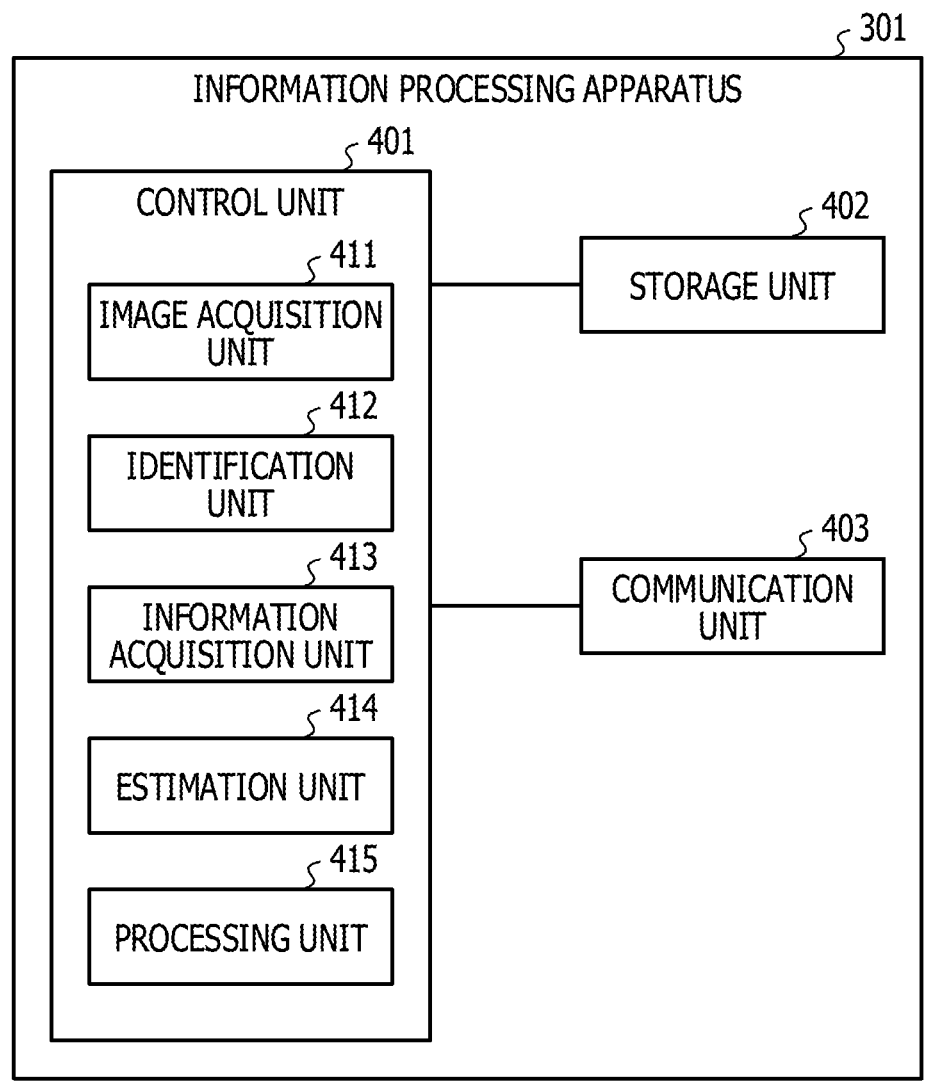
FIG. 4 illustrates an example of the block diagram of an information processing apparatus according to the embodiment.

FIG. 4 illustrates an example of the block diagram of the information processing apparatus 301 according to the embodiment. The information processing apparatus 301 includes, for example, a control unit 401, a storage unit 402, and a communication unit 403. The control unit 401 may operate, for example, as an image acquisition unit 411, an identification unit 412, an information acquisition unit 413, an estimation unit 414, a processing unit 415, and the like. The storage unit 402 may store information, for example, radio wave reception state information 600, intensity distance range information 700, setting position information 800, operation history information 1100, user information 1200, reception state history information 1400, and indication position history information 1500, or the like described later. The communication unit 403 communicates with an external device of the information processing apparatus 301, such as the display device 302, the imaging device 303, the router 310, the access point 320, or the like in accordance with, for example, an instruction from the control unit 401. A description will be given later of the details of each unit and the details of the information stored in the storage unit 402.

The control unit 401 of the information processing apparatus 301 collects identification information for individually identifying the pointing device 305 and the access points 320, and the reception state of the radio waves transmitted and received between the access points 320 and the pointing device 305. The control unit 401 of the information processing apparatus 301 estimates the position of the pointing device 305 identified by the identification information based on the reception state of the radio waves transmitted and received between the access points 320 and the pointing device 305. The control unit 401 of the information processing apparatus 301 associates the position of the pointing device 305 estimated from the reception state and the position where the imaging device 303 has detected an input operation so as to identify a pointing device 305 that has performed the input operation. Accordingly, with the embodiment, it is possible to identify which pointing device has performed the input operation. First, a description will be given of estimation of the position of the pointing device 305 by the reception state of the radio wave.

Figure 5:
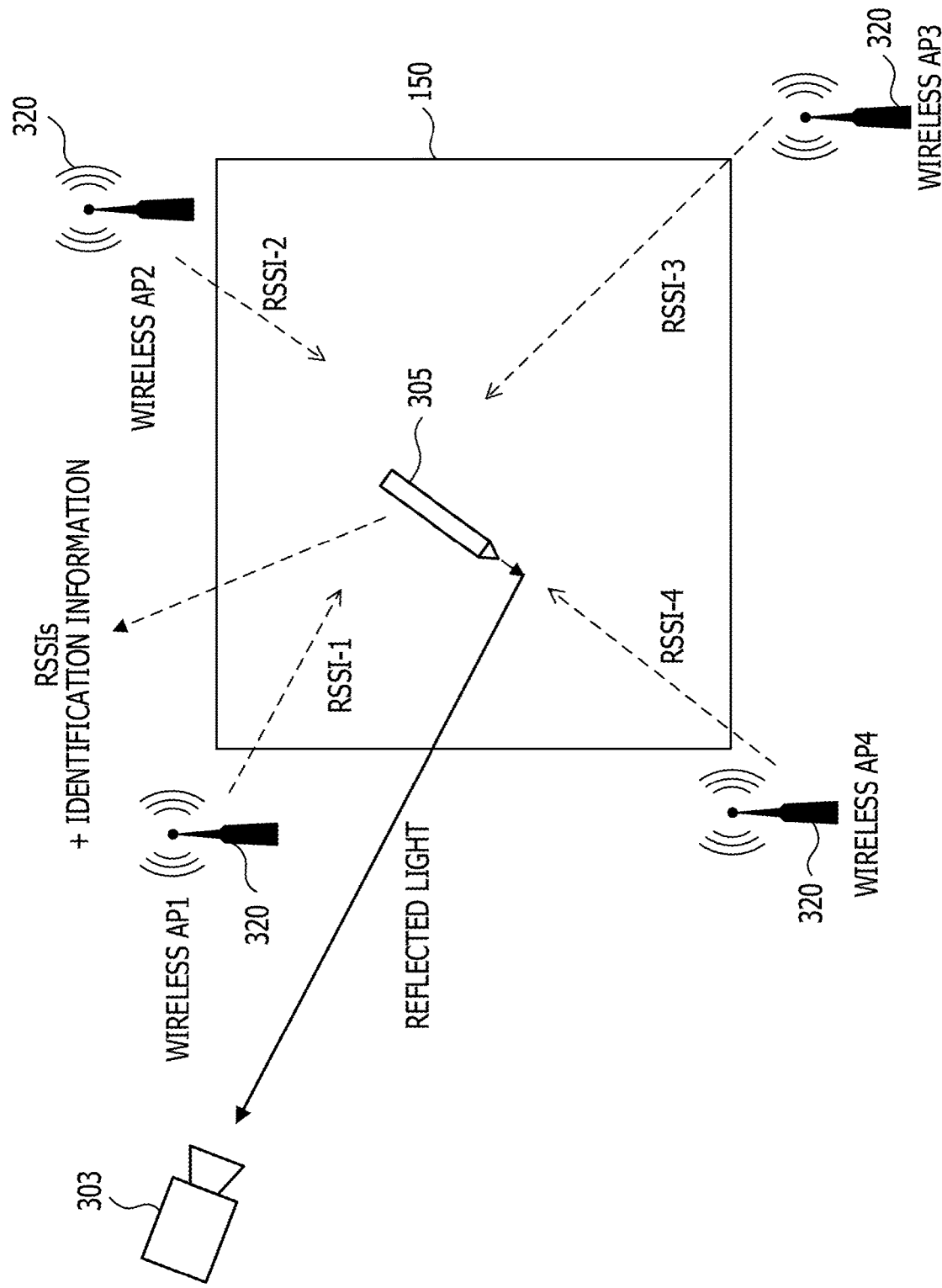
FIG. 5 illustrates an explanatory diagram of estimation processing of the position of a pointing device according to the embodiment.

FIG. 5 illustrates estimation processing of the position of the pointing device 305 according to the embodiment. FIG. 5 illustrates the pointing device 305, the imaging device 303, and a plurality of access points 320. The imaging device 303 captures an image so as to keep the display surface on which the display device 302 displays the object 111 within the angle of view. For example, the imaging device 303 captures an image including the pointing device 305. The control unit 401 of the information processing apparatus 301 detects from the captured image, for example, the light emitted on the display surface 150 by the pointing device 305 and reflected, or the like to identify the indication position indicated by the pointing device 305. It is estimated that the indication position indicated by the pointing device 305 is, for example, in a short distance from the position of the pointing device 305, and thus is possible to be used as the position of the pointing device 305. The indication position indicated by the pointing device 305 on the display surface 150 and the indication position of the pointing device 305 detected from the captured image of the imaging device 303 may be associated with each other in advance by calibration processing. In the calibration processing, the control unit 401, for example, prompts the user to select a predetermined coordinates in the display screen displayed on the display surface 150 by the display device 302 using the pointing device 305. The control unit 401 associates the predetermined coordinates in the display screen with the indication position in the image captured by the imaging device 303 so as to associate the position on the display screen with a position in the image captured by the imaging device 303. The control unit 401 may identify the indication position of the pointing device 305 on the display screen displayed by the display device 302 on the display surface 150 from the indication position of the pointing device 305, detected from the captured image based on the coordinates of the point associated by the calibration.

A plurality of access points 320 are disposed in the surroundings of the display surface 150. In the example in FIG. 5, four access points 320 are disposed in the surrounding four quarters of the display surface 150. The information processing apparatus 301 estimates the position of the pointing device 305 based on the reception state of the radio wave, for example, the reception radio wave intensity of the radio wave transmitted and received between the pointing device 305 and the plurality of access points 320, or the like. The number of access points 320 and the disposition places are not limited to the example illustrated in FIG. 5. For example, the number of access points 320 and the disposition places may be any number and anywhere, respectively as long as it is possible to estimate the position of the pointing device 305 from the reception state of the radio wave transmitted and received between the access point 320 and the pointing device 305. For example, in another embodiment, three or more access points 320 may be disposed so as to surround the display surface 150.

The reception state of the radio wave transmitted and received between the access point 320 and the pointing device 305 may be the reception state of the radio wave transmitted by the pointing device 305 and received by the access point 320 in an embodiment. In this case, the pointing device 305 transmits a radio wave including the identification information of the own device. The access point 320 may transmits the reception state of the received radio wave of the pointing device 305, the identification information of the pointing device 305 to the information processing apparatus 301 with the identification information of the own access point 320. As the identification information of the access point 320, it is possible to use a service set identifier (SSID), for example.

Alternatively, in another embodiment, the reception state of the radio wave transmitted and received between the access point 320 and the pointing device 305 may be the reception state of the radio wave transmitted from the access point 320 and received by the pointing device 305. In this case, the pointing device 305 stores the respective reception states of the radio waves received from the plurality of access points 320 in association with the identification information of the respective access points 320. The pointing device 305 may transmit the respective reception states of the radio waves from the plurality of access point 320 and the identification information of the access points to the information processing apparatus 301 with the identification information of the own device via any one of the access points 320.

As described above, it is possible for the information processing apparatus 301, for example, to collect the reception state of the radio wave transmitted and received between the access point 320 and the pointing device 305 and generates radio wave reception state information 600.

FIG. 6 illustrates an example of the radio wave reception state information 600 according to the embodiment. In the example in FIG. 6, the radio wave reception state information 600 stores an entry including information on date and time, device information, wireless communication apparatus information, and information on the reception radio wave intensity as the reception state of the radio wave. Date and time is information that indicates the date and time when the reception state of the radio wave corresponding to the entry was detected. Device information is, for example, the identification information that identifies the pointing device 305 out of a pair of the access point 320 having the detected reception state of the radio wave corresponding to the entry and the pointing device 305. Wireless communication apparatus information is, for example, identification information for identifying the access point 320 out of a pair of the access point 320 having the detected reception state of the radio wave corresponding to the entry and the pointing device 305. Radio wave intensity is an example of the reception state of the radio wave and, for example, is the reception intensity of the radio wave transmitted and received between the pointing device 305 identified by the device information at the date and time of the entry and the access point 320 identified by the wireless communication apparatus information.

When the control unit 401 of the information processing apparatus 301 collects the information on the reception state of the radio wave, the control unit 401 may store each identification information of the access point 320 having the reception state detected and the pointing device 305 in an entry of the radio wave reception state information 600. The control unit 401 may store the reception time when the control unit 401 received the information of the reception state of the radio wave transmitted and received between the access points 320 and the pointing device 305 with the received reception state in the entry of the radio wave reception state information 600. Alternatively, the control unit 401 may notify the information processing apparatus 301 of the acquisition time in association with the radio wave intensity at the time when the access point 320 or the pointing device 305 obtained the information on the reception state of the radio wave transmitted and received between the access point 320 and the pointing device 305. In this case, the control unit 401 of the information processing apparatus 301 may store the notified time in the date and time field in the radio wave reception state information 600 to create an entry.

Next, a description will be given of estimation of the position of the pointing device 305 using the reception state of the radio wave transmitted and received between each of the plurality of access points 320 and the pointing device 305 at a certain time stored in the radio wave reception state information 600. For example, the control unit 401 estimate an area in which the pointing device 305 is located using the intensity and distance range information 700 that associates the range of the radio wave intensity with the distance range from the access point 320 and the setting position information 800 that indicates the setting position of an access point 320.

FIG. 7 illustrates an example of the intensity and distance range information 700 according to the embodiment. The intensity and distance range information 700 may store, for example, an entry that associates a range of the radio wave intensity with a distance range from the transmission source of the radio wave estimated from the range of the radio wave intensity. As an example, the range of the radio wave intensity may be set such that the range of the radio wave intensity does not overlap the range of the radio wave intensity of the other entries. The higher the radio wave intensity of the radio wave intensity range, the shorter the distance of the distance range from the access point 320 may be stored in the intensity and distance range information 700.

FIG. 8 illustrates an example of the setting position information 800 according to the embodiment. For example, the setting position information 800 includes an entry that associates wireless communication apparatus information with information of an access point (AP) position. The wireless communication apparatus information is, for example, identification information for identifying an access point 320. The access point position is, for example, information indicating the setting position of an access point identified by the wireless communication apparatus information of the entry. In an embodiment, an access point position may be represented by the coordinates in a plane coordinate system including the display surface 150 on which the object 111 is displayed. The origin of the plane coordinate system may be set at any point, for example, a point on the display surface 150, or the like.

When the control unit 401 estimates, for example, the position of the pointing device 305 at a certain time, the control unit 401 obtains the radio wave intensity at the time between the pointing device 305 whose position is to be estimated and a plurality of surrounding access points 320 from the radio wave reception state information 600. The control unit 401 obtains a distance range corresponding to the obtained radio wave intensity between the pointing device 305 and the plurality of access points 320 from the intensity and distance range information 700. The control unit 401 obtains the setting position of each of the plurality of access points 320 from the setting position information 800.

Figure 9:
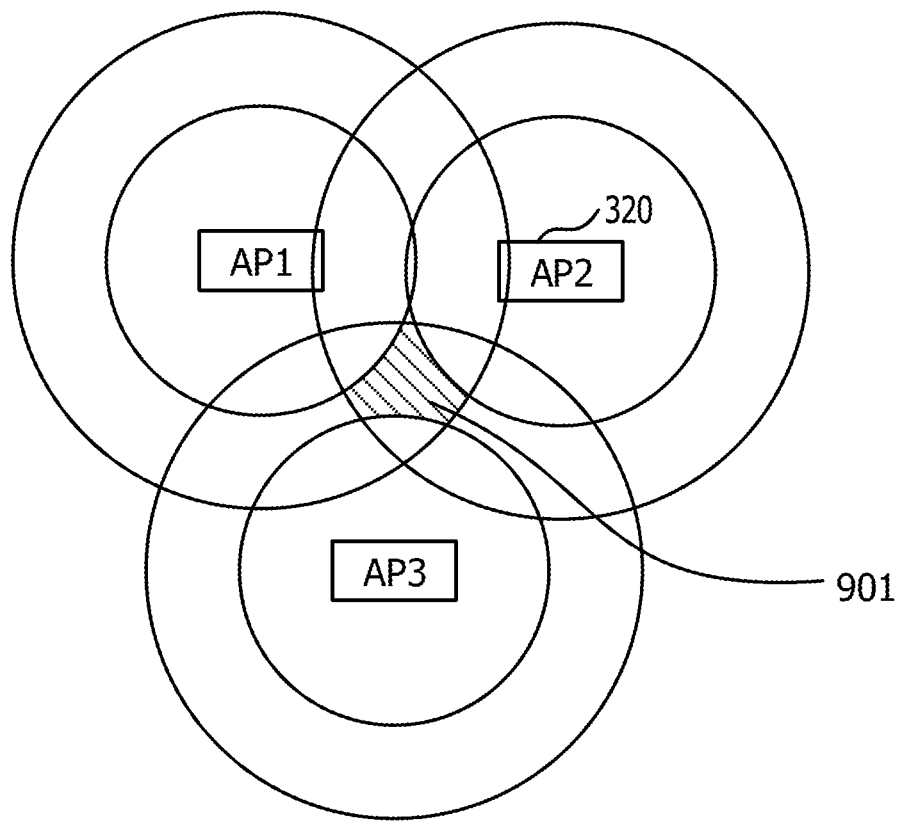
FIG. 9 illustrates plotted figures of the distance ranges corresponding to the radio wave intensities from the respective setting positions of access points.

FIG. 9 illustrates plotted figures of the distance range corresponding to the radio wave intensities from the respective setting positions of the access points 320. The example in FIG. 9 illustrates three access points 320 from AP1 to AP3. The distance ranges corresponding to the reception radio wave intensities of the radio wave transmitted and received between the access point 320 and the pointing device 305 are illustrated around the respective access points 320. It is possible for the control unit 401 to estimate that the pointing device 305 is located in an area 901 in which the distance ranges of the respective access points 320 overlap with each other. In an embodiment, the control unit 401 may estimate one representative point of the area 901 as the position of the pointing device 305. For example, the control unit 401 may use the center of gravity of the area 901, the center coordinates of the circumscribed rectangle of the area 901, or the like as one representative point to be used for the position of the pointing device 305.

For example, the control unit 401 associates the estimation position of the pointing device 305 estimated from the radio wave intensity as described above with the indication position indicated by the light of the pointing device 305 detected from the captured image by the imaging device 303 at the same time. For example, if the indication position of the pointing device 305, which has been detected from the captured image, is located within a predetermined distance from the estimation position of the pointing device 305, which has been estimated from the radio wave intensity, the control unit 401 may associate the two positions. The position of the pointing device 305, which has been estimated from the radio wave intensity, is associated with the identification information for identifying the pointing device 305. Accordingly, it is possible for the control unit 401 to associate the indication position with the identification information of the pointing device 305 by associating the estimation position of the pointing device 305, which has been estimated from the radio wave intensity, with the indication position detected from the captured image. Accordingly, it is possible for the control unit 401 to identify which pointing device 305 has input the operation detected from the image captured by the imaging device 303.

The estimation of the position of the pointing device 305 based on the radio wave intensity is not limited to the method illustrated in FIG. 9, and the other methods may be used in the other embodiments. For example, the control unit 401 may estimate the position of the pointing device 305 by a method called fingerprinting using data obtained by learning in advance the combinations of the radio wave intensities for each of the coordinates of the position of the pointing device 305.

Figure 10:
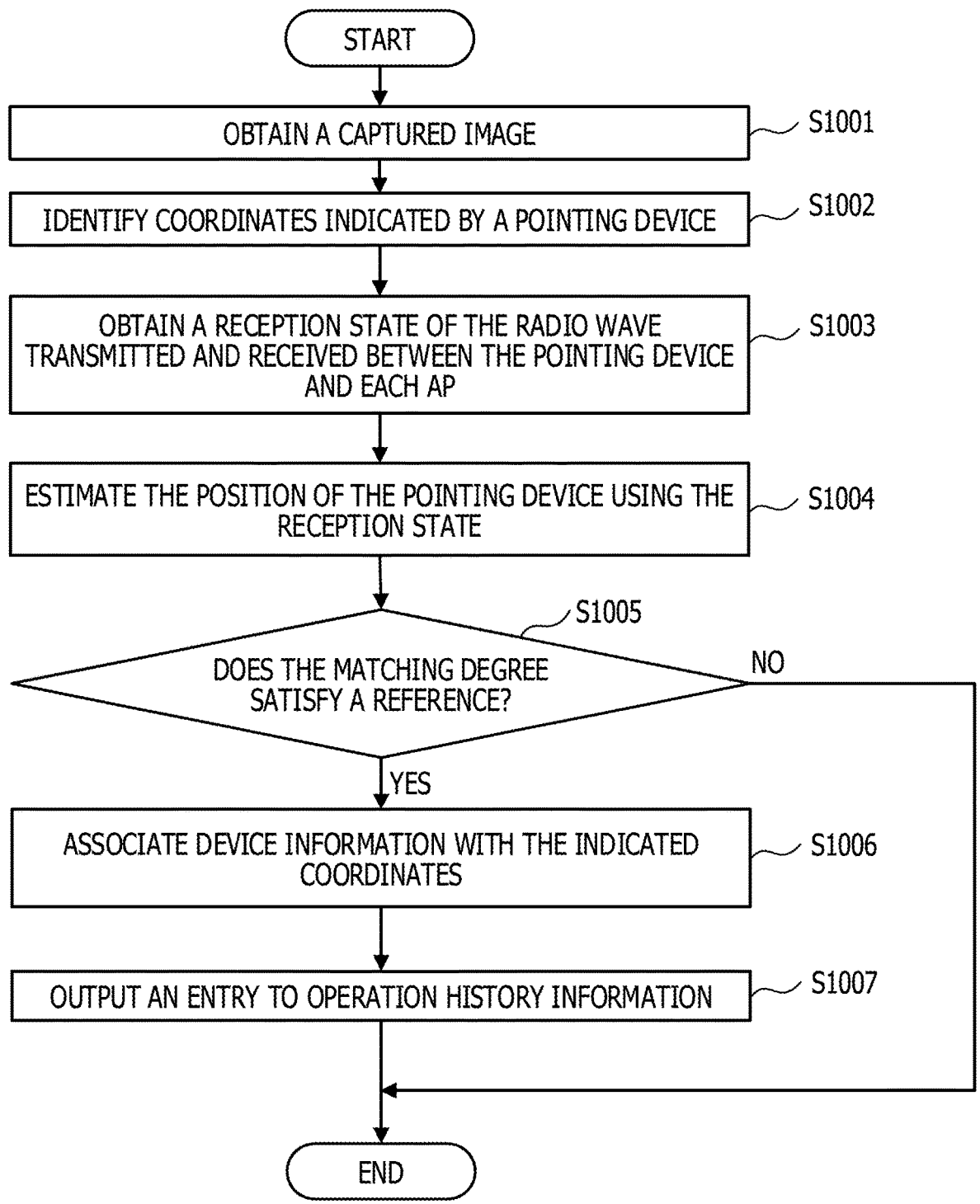
FIG. 10 illustrates an example of the operation flow of input processing according to the embodiment.

Next, a description will be given of the operation flow of input processing according to the embodiment with reference to FIG. 10. FIG. 10 illustrates an example of the operation flow of input processing according to the embodiment. When the control unit 401 of the information processing apparatus 301 detects, for example, that input by the pointing device 305 is started from the image captured by the imaging device 303, the control unit 401 may start the operation flow in FIG. 10.

In step 1001 (hereinafter, step is described as "S", and, for example, step 1001 is written as S1001), the control unit 401 obtains a captured image from the imaging device 303.

In S1002, the control unit 401 identifies indication coordinates indicated by the pointing device 305. The indication coordinates indicated by the pointing device 305 are located in a short distance from the pointing device 305 and thus are possible to be used as the position of the pointing device 305.

In S1003, the control unit 401, for example, obtains the reception state of the radio wave transmitted between each access point 320 of the plurality of access points 320 and the pointing device 305. The control unit 401 may obtain, for example, the reception state in association with the device information and the wireless communication apparatus information from the radio wave reception state information 600 stored in the storage unit 402. The information stored in the radio wave reception state information 600 may be individually collected from each access point 320 of the plurality of access points 320. Alternatively, the information stored in the radio wave reception state information 600 may be collected by the pointing device 305 once and the data may be received via the access point 320, or may be directly received by short-distance wireless communication, such as Bluetooth (registered trademark), or the like.

In S1004, the control unit 401 estimates the position of the pointing device 305 based on the reception state included in the radio wave reception state information 600. For example, if the reception state of the radio wave is indicated by the radio wave intensity, as illustrated by the example with reference to FIG. 9, the control unit 401 may estimate the position of the pointing device 305 from the radio wave intensity using the intensity and distance range information 700 and the setting position information 800. Alternatively, in another embodiment, the control unit 401 may estimate the position of the pointing device 305 from the radio wave intensity using another method, such as a method called fingerprinting, or the like. The distance between the access point 320 and the pointing device 305 is a value having a correlation with the reception radio wave intensity of the radio wave between the access point 320 and the pointing device 305. Accordingly, it is possible for the control unit 401 to estimate the position of the pointing device 305 from the reception radio wave intensity. The number of access points 320 used for estimating the position may be any number. However, the larger the number of access points 320, the larger the amount of information, and thus the precision of the estimated position may be improved. It is desirable that the number of access points 320 used for estimating the position of the pointing device 305 be three or more as an example.

In S1005, the control unit 401 determines whether or not the matching degree between the indication coordinates of the pointing device 305 identified in S1002 and the estimation position of the pointing device 305, which has been estimated from the reception state of the radio wave in S1004, satisfies a reference. For example, if the distance between the indication coordinates of the pointing device 305 and the estimation position of the pointing device 305, which has been estimated from the reception state of the radio wave in S1004, is less than or equal to a predetermined threshold value, the control unit 401 may determine that the matching degree satisfies the reference. If the matching degree does not satisfy the reference in S1005 (No in S1005), the processing is terminated. On the other hand, if the matching degree satisfies the reference in S1005 (Yes in S1005), the processing proceeds to S1006.

In S1006, the control unit 401 obtains the device information associated with the estimation position having the matching degree satisfying the reference from the radio wave reception state information 600 and associates the device information with the indication coordinates identified in S1002.

In S1007, the control unit 401 outputs an entry including the information regarding the input operation to the operation history information 1100, and the processing is terminated. The control unit 401 may, for example, perform the operation that has been input on the object 111.

FIG. 11 illustrates an example of the operation history information 1100 according to the embodiment. The operation history information 1100 may store an entry including information, for example, object information, device information, user information, operation date and time, operation position, operation type, and operation contents. Object information is, for example, an identifier for identifying the object 111 displayed by the display device 302 on the display surface 150. Device information is, for example, identification information for identifying a pointing device 305 that has input the operation corresponding to the entry. User information is, for example, information for identifying a user who has input the operation corresponding to the entry. For example, as illustrated in FIG. 12, user information 1200 that associates device information for identifying a pointing device 305 with user information for identifying a user who uses the pointing device 305 may be stored in the storage unit 402 in advance. The control unit 401 may identify user information associated with the user information 1200 from the device information and store the user information in the user information field of the user information 1200. Operation date and time of the operation history information 1100 is, for example, information indicating the date and time when operation corresponding to the entry was input. As an example, operation date and time may be start time when the operation input was started. Operation position is, for example, information indicating the input position of the operation corresponding to the entry and an indication position of the pointing device 305 identified from the captured image may be stored. If the operation is a move operation of an object, or the like, when the operation is input by the locus of an indication position, a plurality of positions that indicate the locus of the indication position, obtained at a predetermined time interval, may be stored in the operation position field. Operation type is, for example, information indicating the type of the operation that was input by the operation corresponding to the entry. Operation contents are, for example, information indicating the contents of the operation input by the operation corresponding to the entry. In the operation history information 1100, device information is associated with information on the operation, such as the operation position, or the like. Accordingly, it is possible for the user to identify which pointing device 305 has input the operation by referring to the operation history information 1100.

A pointing device 305 and a user who uses the pointing device 305 are stored in the operation history information 1100 in association with each other using the user information 1200, and thus it is possible to identify a user who has input an operation. Accordingly, for example, it becomes possible to associate a user, an operation, and an object. It is possible to keep operation history for each user, and, for example, to identify who is an originator of an idea, and thus to maintain the rights of the originator. It is possible to manage the person who manages an object, and thus, for example, it is possible to provide the setting that inhibits the other person from deleting, editing, bringing back the own data, or the like.

Variation

For example, if there are a plurality of pointing devices 305 that are located in a short distance with each other, indication coordinates that are input from a plurality of pointing devices 305 are sometimes identified from the captured image within a threshold distance from the position estimated from the reception state of the radio wave in S1004. In this case, a plurality of pointing devices 305 are located within the threshold distance from the position of the pointing device 305, which has been estimated from the radio wave intensity, and thus it is not possible to associate the indication coordinates identified from the captured image with the pointing device 305. In the following, a description will be given of a variation for associating the indication coordinates identified from the captured image with the pointing device 305 even if a plurality of pointing device 305 are located within a short distance from each other.

Figure 13B:
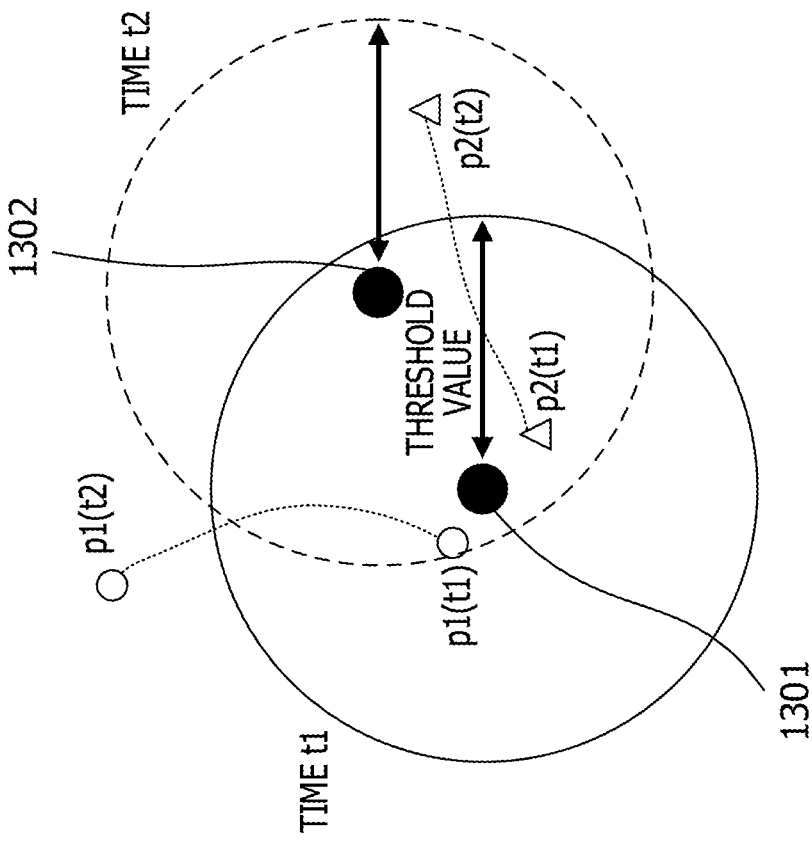
FIG. 13B illustrates a specific example of a pointing device according to the variation.
Figure 13A:
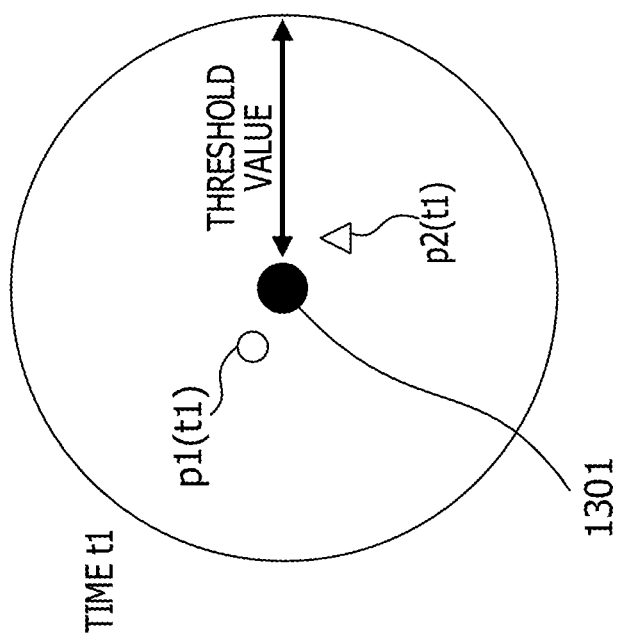
FIG. 13A illustrates a specific example of a pointing device according to a variation.

FIGS. 13A and 13B illustrate a specific example of the pointing device 305 according to the variation. In FIG. 13A, a black circle indicates an estimation position 1301 of the pointing device 305 estimated from the reception state of the radio wave at time t1. As illustrated in FIG. 13A, it is assumed that there are two indication coordinates, p1(t1) and p2(t1), which are identified from the captured image, within a distance shorter or equal to a predetermined threshold value from the estimated position 1301 at time t1. In this case, a plurality of indication coordinates are included within a threshold value, and thus it is not possible to associates the operation indicated by the indication coordinates with the pointing device 305. In such a case, in the variation, the control unit 401 uses the information of the locus of the indication coordinates of the pointing device 305 identified from the captured image with the information of the locus of the estimation position of the pointing device 305, which has been estimated from the reception state of the radio wave.

FIG. 14 illustrates an example of the reception state history information 1400 of the pointing device 305 according to the embodiment. The reception state history information 1400 includes, for example, the history of the radio wave state of the radio wave transmitted and received between the pointing device 305 and the access point 320. For example, the reception state history information 1400 stores an entry including date and time, device information, wireless communication apparatus information, and information on the radio wave intensity. Date and time is information indicating the date and time when the reception state of the radio wave corresponding to the entry was detected. Device information is, for example, identification information for identifying the pointing device 305 out of a pair of the access point 320 and the pointing device 305 having the reception state of the radio wave corresponding to the entry. Wireless communication apparatus information is, for example, identification information for identifying the access point 320 out of a pair of the access point 320 and the pointing device 305 having the reception state of the radio wave corresponding to the entry. Radio wave intensity is an example of the reception state of the radio wave and is, for example, the reception intensity of the radio wave transmitted and received between the pointing device 305 identified by the device information and the access point 320 identified by the wireless communication apparatus information at the date and time of the entry. The control unit 401 may collect, for example, the information of the reception state of the radio wave transmitted and received between the pointing device 305 and each of the plurality of access points 320 at predetermined time intervals and store the information in an entry of the reception state history information 1400. The control unit 401 may individually collect the reception state of the radio wave from each access point 320 of a plurality of access points 320. Alternatively, the control unit 401 may receive the reception state of the radio wave collected by the pointing device 305 once via the access point 320, or may directly receive the reception state of the radio wave by short-distance wireless communication, such as Bluetooth (registered trademark), or the like.

FIG. 15 illustrates an example of the indication position history information 1500 according to the embodiment. The indication position history information 1500 stores the history of the indication coordinates of the light emitted by the pointing device 305 that has been detected from the image captured by the imaging device 303. The indication position history information 1500 stores an entry including information, for example, date and time, operation identification information, and coordinates. For example, if the imaging device 303 detects the light spot projected by the pointing device 305 from the image captured at predetermined time intervals, the control unit 401 may store an entry that associates the imaging date and time, the coordinates of the light spot, and operation identification information in the indication position history information 1500. For example, if light spots are detected at positions having distances between the coordinates less than or equal to a predetermined distance consecutively from the images captured by the imaging device 303 at predetermined time intervals, the control unit 401 may regards those light spots as one operation and may assign the same operation identification information. On the other hand, for light spots that have not been taken consecutively in the images captured by the imaging device 303 at predetermined time intervals, or for light spots that have been taken in captured images consecutively, but the distances between the coordinates are longer than a predetermined distance, the control unit 401 may assign different operation identification information.

The control unit 401 associates the indication coordinates and the pointing device 305 in the case where a plurality of indication coordinates are included within the range of a threshold value, which is described with reference to FIG. 13A, for example, using information of the reception state history information 1400 and the indication position history information 1500. FIG. 13B illustrates the estimation position 1301 at time t1, illustrated in FIG. 13A, and the two indication coordinates p1(t1) and p2(t1) that have been identified from the captured image. FIG. 13B illustrates the estimation position 1302 at time t2 and the two indication coordinates p1(t2) and p2(t2) identified from the captured image at time t2. It is possible for the control unit 401 to obtain the estimation position 1302 at time t2 from the radio wave intensity of the reception state history information 1400. It is possible for the control unit 401 to obtain the two indication coordinates p1(t2) and p2(t2) identified from the captured image at time t2 from the indication position history information 1500. It is assumed that the same operation identification information is assigned to the indication coordinates p1(t1) and the indication coordinates p1(t2) in the indication position history information 1500. It is assumed that the same operation identification information is assigned to the indication coordinates p2(t1) and the indication coordinates p2(t2) in the indication position history information 1500.

As illustrated in FIG. 13B, only the indication coordinates p2(t2) are included in the range of a threshold value from the estimation position 1302 at time t2, and the indication coordinates p1(t2) are out of the range of the threshold value. Accordingly, it is possible for the control unit 401 to associate the estimation position 1302 with the indication coordinates p2(t2). The indication coordinates p2(t1) are the indication coordinates of the operation identified by the same operation identification information as the operation of the indication coordinates p2(t2), and thus it is also possible for the control unit 401 to associate the estimation position 1301 with p2(t1).

As described above, for example, at certain time t1, it is sometimes not possible to associate the position estimated from the reception state of the radio wave with the indication coordinates of the pointing device 305 detected from the captured image. In this case, in the variation, it is possible for the control unit 401 to make an association at a certain time t1 using the position estimated from the reception state of the radio wave at the different time t2 and the indication coordinates of the pointing device 305, which has been detected from the captured image. The other time t2 may be time before the certain time t1 or time after the certain time t1.

Figure 16A:
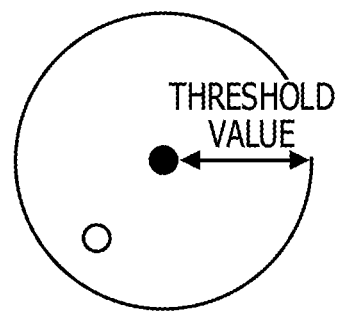
FIG. 16A illustrates an example of adjustment processing of a threshold value according to the embodiment.
Figure 16B:
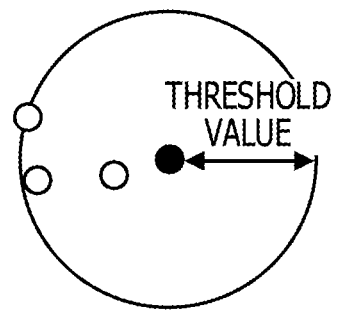
FIG. 16B illustrates an example of adjustment processing of a threshold value according to the embodiment.
Figure 16C:
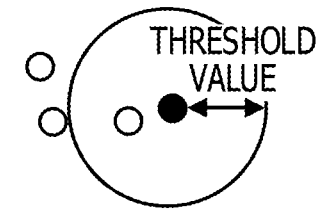
FIG. 16C illustrates an example of adjustment processing of a threshold value according to the embodiment.

FIGS. 16A, 16B, and 16C illustrate an example of adjustment processing of a threshold value according to the embodiment. For example, if the number of pointing devices 305 used in the input system 300 is small, there is a little chance that a plurality of pointing devices 305 are located within a short distance from each other. In this case, as illustrated in FIG. 16A, there is a high possibility that the number of the indication coordinates of the pointing devices 305 becomes one that are included within a distance shorter than or equal to a predetermined threshold value from the position of the pointing device 305, which has been estimated from the reception state of the radio wave.

On the other hand, for example, if a large number of pointing devices 305 are used in the input system 300, a situation arises in which a plurality of pointing devices 305 are located in a short distance with each other. In this case, as illustrated in FIG. 16B, a plurality of indication coordinates of the pointing device 305 are sometimes located within a predetermined distance from the position estimated from the radio wave intensity. As a result, it is sometimes not possible to associate the position of the pointing device 305 estimated from the radio wave intensity with the indication coordinates input by the pointing device 305 that has been identified from the captured image.

Thus, for example, it is assumed that an estimation is made that there is a possibility that the number of pointing devices 305 used in the input system 300 is larger than a predetermined value and that a plurality of pointing devices 305 are located in a short distance with each other. In this case, the control unit 401 may make an adjustment to have a smaller threshold value as illustrated in FIG. 16C. In the example in FIG. 16C, a threshold value smaller than the threshold value in FIG. 16B is set so that the number of the indication coordinates of the pointing devices 305 included within the range of a predetermined distance from the estimation position estimated from the radio wave intensity has become one. Accordingly, it is possible to associate the position of the pointing device 305 estimated from the radio wave intensity with the input indication coordinates of the pointing device 305 identified from the captured image.

Figure 17:
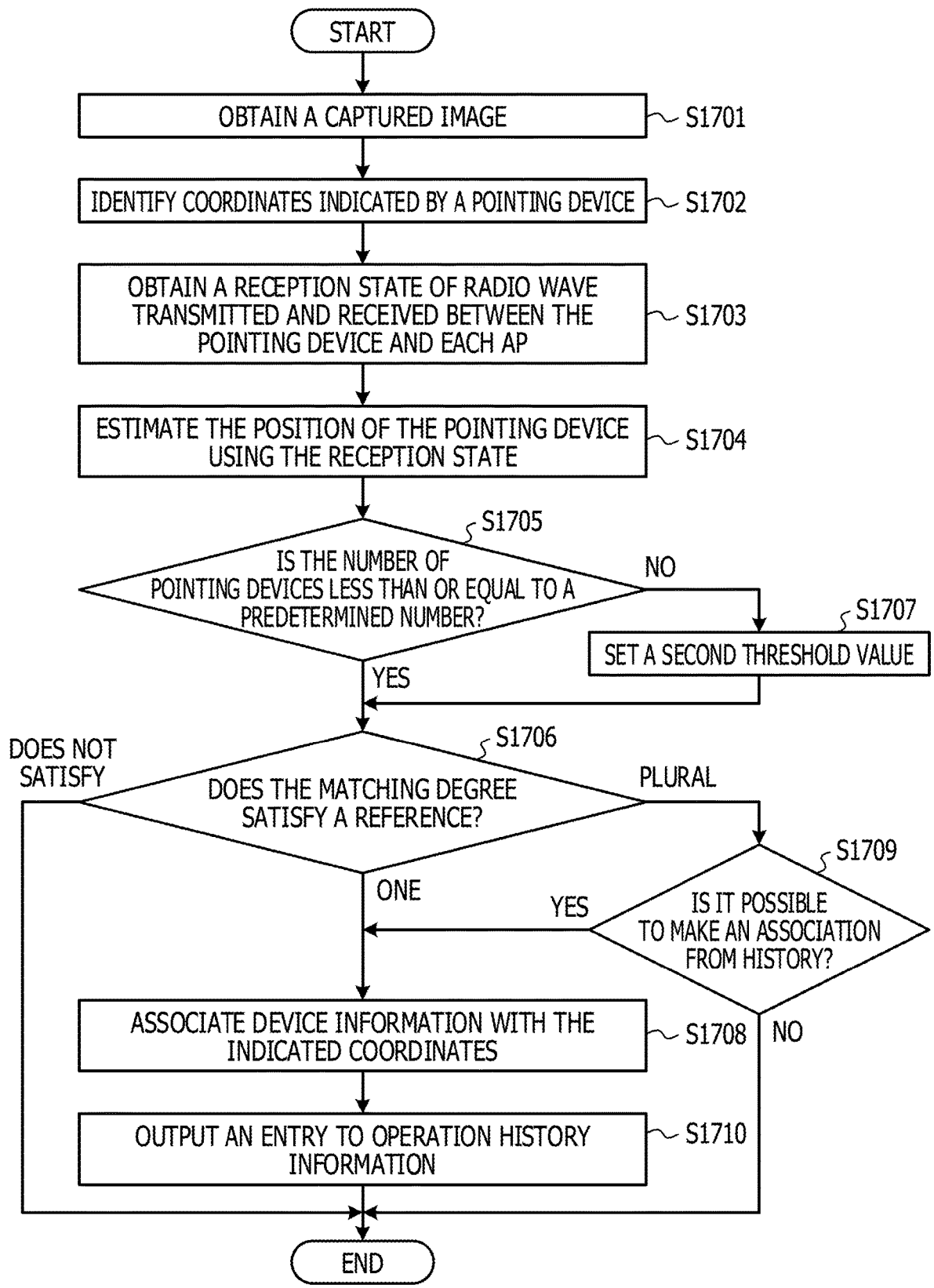
FIG. 17 illustrates an example of the operation flow of input processing according to the variation.

FIG. 17 illustrates an example of the operation flow of the input processing according to the variation. When the control unit 401 of the information processing apparatus 301 detects that input of the pointing device 305 has started, for example, from the image captured by the imaging device 303, the control unit 401 may start the operation flow in FIG. 17.

The operation flow in FIG. 17 may correspond to the operation flow in FIG. 10. For example, in each processing from S1701 to S1704, S1706, S1708, and S1710, the control unit 401 may execute the same processing as a corresponding one of the processing from S1001 to S1007.

In the processing in FIG. 17, in S1705, the control unit 401 determines whether or not the number of pointing devices 305 is less than or equal to a predetermined value. The predetermined value may be set to, for example, a value estimated to have a high possibility of using the pointing devices 305 by users in a short distance if the number of users per surface area is higher than that value in accordance with the density of users, which is estimated from the number of users with respect to the size of the display surface 150. In S1705, if the number of pointing devices is less than or equal to the predetermined value (Yes in S1705), the processing proceeds to S1706. In this case, the control unit 401 may determine whether or not the matching degree satisfies a reference using a first threshold value preset in advance in S1706.

On the other hand, if the number of pointing devices is larger than the predetermined value (No in S1705) in S1705, the processing proceeds to S1707. In S1707, the control unit 401 changes a first threshold value set in advance to a second threshold value, which is a shorter distance than the first threshold value. In this case, the control unit 401 may determine whether or not the matching degree satisfies the reference using the changed second threshold value in S1706.

In S1706, if the matching degree does not satisfy the reference (S1706 does not satisfy), the processing is terminated. In S1706, if the position of one pointing device 305 having the matching degree satisfies the reference is identified (one in S1706), the processing proceeds to S1708. However, if the positions of a plurality of pointing devices 305 having the matching degree that satisfies the reference are identified in S1706 (plural in S1706), the processing proceeds to S1709. In S1709, the control unit 401 determines whether or not it is possible to associate the position estimated from the reception state of the radio wave with the input indication coordinates based on the reception state history information 1400 and the indication position history information 1500. For example, as illustrated in the example with reference to FIGS. 13A and 13B, the control unit 401 tries to associate the estimation position estimated from the reception state of the radio wave at different time with the indication coordinates identified from the captured image using the reception state history information 1400 and the indication position history information 1500. If it is possible to associate the estimation position estimated from the reception state of the radio wave at the different time with the indication coordinates identified from the captured image (Yes in S1709), the control unit 401 makes an association using the association at that time in S1708. On the other hand, if it is not possible to associate the estimation position estimated from the reception state of the radio wave at the different time with the indication coordinates identified from the captured image (No in S1709), the processing is terminated.

Accordingly, in the variation, in addition to the advantages in the above-described embodiment, it is possible to associate the position estimated from the reception state with the input indication coordinates even if a plurality of pointing devices 305 are densely located.

For example, it is assumed that the situation is estimated in which the number of pointing devices 305 used in the input system 300 is large with respect to the size of the display surface, and a plurality of pointing devices 305 are densely located. In this case, in the variation, the threshold value of the distance used for associating the estimation position estimated from the reception state with the input indication coordinates identified from the captured image is changed to a smaller value. Accordingly, it is possible to reduce the state in which there are a plurality of input indication coordinates identified from the captured image within a distance of a threshold value from the position estimated from the reception state, and thus it is difficult to make an association.

For example, in the variation, if there are a plurality of input indication coordinates within a distance of a threshold value from the position estimated from the reception state, the control unit 401 associates the position estimated from the reception state at different time with the input indication coordinates identified from the captured image. The control unit 401 identifies the indication coordinates to be associated with the indication coordinates out of a plurality of input indication coordinates using the association at the different time. Accordingly, if there are a plurality of input indication coordinates within a distance of the threshold value from the position estimated from the reception state, it is possible to associate the position estimated from the reception state with the input indication coordinates.

In the above, descriptions have been given of the embodiments. However, the embodiment is not limited to these. For example, the operation flows described above are examples, and the embodiment is not limited to these. If possible, the processing order in the operation flow may be changed, and the processing may include further processing separately, or a part of the processing may be omitted. For example, the order of the processing of S1002 and S1003 in FIG. 10 may be replaced and executed, and the order of the processing of S1702 and S1703 may be replaced and executed.

In the above-described embodiment, a description has been given of the example in which both the processing (corresponding to S1705 to S1707 in FIG. 17) exemplified in FIGS. 16B and 16C and the processing (corresponding to S1709 in FIG. 17) exemplified in FIG. 13B to FIG. 15 are performed. However, the embodiment is not limited to this. For example, in another embodiment, either of the processing may be performed, and the other processing may be deleted and not performed.

For example, in the above-described embodiment, another wireless communication apparatus may be used instead of the access point 320. For example, it is possible to use a beacon transmitter as the wireless communication apparatus in another embodiment. In this case, the pointing device 305 may detect the radio wave intensity of a beacon transmitted by a transmitter and may notify the information processing apparatus 301 of the detected information on the radio wave intensity via an access point disposed separately.

The configuration of the input system 300 described above is an example, and the embodiment is not limited to this. For example, in another embodiment, a computer that mediates a connection between the information processing apparatus 301, the display device 302, and the imaging device 303 may be further included. In this case, the information processing apparatus 301 may operate, for example, as a server, and may control the display device 302 and the imaging device 303 via the computer.

In the above-described embodiment, a description has been given of the example of using the reception radio wave intensity as an example of the reception state of the radio wave. However, the embodiment is not limited to this. For example, the other values may be used as long as it is possible to estimate the distance from the access point 320 to the pointing device 305.

As another method of associating the indication position of the pointing device 305 based on the captured image with the input pointing device 305, the following method is considered.

For example, it is thought that a pointing device 305 is identified by characterizing the pattern and color of the outer package of the pointing device 305 and detecting the characteristic from the captured image. However, it sometimes becomes difficult to identify the pointing device 305, for example, in the case where the characteristic given to a pointing device 305 is similar to the projected image or the pattern and the color of clothes of a user, in the case where the characteristic is not taken in the captured image by being blocked by a user's hand, or the like.

As another method, it is thought that a pen is identified by the blinking pattern of the light emitted from the pointing device 305, or the like. However, an increase in the number of pointing devices 305 to be identified causes the blinking interval of the blinking pattern to be narrowed. In this case, in a situation in which the specification of the camera is low, or the like, it is sometimes not possible to correctly recognize the blinking pattern.

Accordingly, it is desirable that the other methods of identifying the pointing device 305 be provided. In particular, it is desirable to provide a method of identifying the pointing device 305 using information other than the information obtained from the captured image. Accordingly, the above-described method according to the embodiment, which identifies the pointing device 305 using the reception state of the radio wave, is useful.

In the above-described embodiment, for example, in the processing of S1001 and S1701, the control unit 401 of the information processing apparatus 301 operates as the image acquisition unit 411. In the processing of S1002 and S1702, the control unit 401 of the information processing apparatus 301 operates, for example, as the identification unit 412. In the processing of S1003 and S1703, the control unit 401 of the information processing apparatus 301 operates, for example, as the information acquisition unit 413. In the processing of S1004 and S1704, the control unit 401 of the information processing apparatus 301 operates, for example, as the estimation unit 414. In the processing of S1007 and S1710, the control unit 401 of the information processing apparatus 301 operates, for example, as the processing unit 415.

Figure 18:
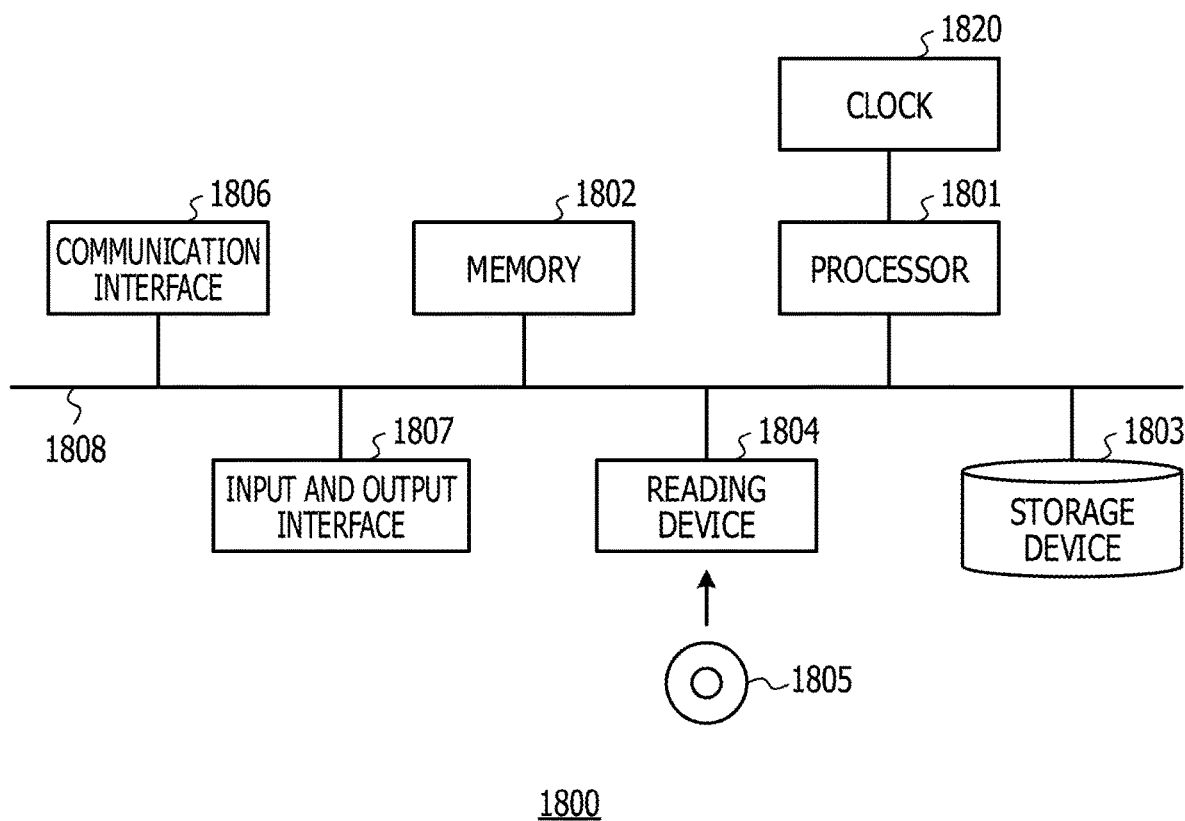
FIG. 18 illustrates an example of the hardware configuration of a computer for realizing the information processing apparatus according to the embodiment.

FIG. 18 illustrates an example of the hardware configuration of a computer 1800 for realizing the information processing apparatus 301 according to the embodiment. The hardware configuration for realizing the information processing apparatus 301 in FIG. 18 includes, for example, a processor 1801, a memory 1802, a storage device 1803, a reading device 1804, a communication interface 1806, an input and output interface 1807, and a clock 1820. The processor 1801, the memory 1802, the storage device 1803, the reading device 1804, the communication interface 1806, and the input and output interface 1807 are mutually connected, for example, via a bus 1808.

The processor may be, for example, a single processor, a multiprocessor, or a multicore. The processor 1801, for example, executes a program describing the procedure of the operation flow described above using the memory 1802 so as to provide a part of or all of the functions of the control unit 401 described above. For example, the processor 1801 of the information processing apparatus 301 may read and execute the program stored in the storage device 1803 so as to operate as the image acquisition unit 411, the identification unit 412, the information acquisition unit 413, the estimation unit 414, the processing unit 415, and the like.

The memory 1802 is, for example, a semiconductor memory, and may include a RAM area and a ROM area. The storage device 1803 is a hard disk, a semiconductor memory, for example, a flash memory, or the like, or an external storage device. RAM is an abbreviation of a random access memory. ROM is an abbreviation of a read only memory.

The reading device 1804 accesses a removable storage medium 1805 in accordance with an instruction of the processor 1801. The removable storage medium 1805 is realized, for example, by a semiconductor device (USB memory, or the like), a medium (magnetic disk, or the like) on which information is input and output by magnetic operation, a medium (CD-ROM, DVD, or the like) on which information is input and output by optical operation, or the like. USB is an abbreviation of a Universal Serial Bus. CD is an abbreviation of a Compact Disc. DVD is an abbreviation of a Digital Versatile Disk.

The storage unit 402 includes, for example, a memory 1802, a storage device 1803, and a removable storage medium 1805. The storage device 1803 of the information processing apparatus 301 may store, for example, the radio wave reception state information 600, the intensity distance range information 700, the setting position information 800, the operation history information 1100, the user information 1200, the reception state history information 1400, and the indication position history information 1500, and the like.

The communication interface 1806 may be connected to, for example, the display device 302 and the imaging device 303, and transmits and receives data to and from the display device 302 and the imaging device 303 in accordance with an instruction of the processor 1801. The communication interface 1806 may transmit and receive data to and from the access point 320 via the router 310, for example, in accordance with an instruction of the processor 1801. The communication interface 1806 is an example of the communication unit 403 described above. The input and output interface 1807 may be, for example, an interface between an input device and an output device. The input device is, for example, a device that receives an instruction from a user, such as a keyboard, a mouse, or the like. The output device is, for example, a display device, such as a display, or the like and an audio device, such as a speaker, or the like. The clock 1820 supplies time information to the processor 1801 in accordance with the instruction of the processor 1801.

The hardware configuration for realizing the information processing apparatus 301, which has been described with reference to FIG. 18, is an example and the embodiment is not limited to this. For example, a part of or all of the functions of the functional units described above may be implemented as hardware by an FPGA and a SoC, or the like. FPGA is an abbreviation of a field programmable gate array. SoC is an abbreviation of a system-on-a-chip.

Figure 19:
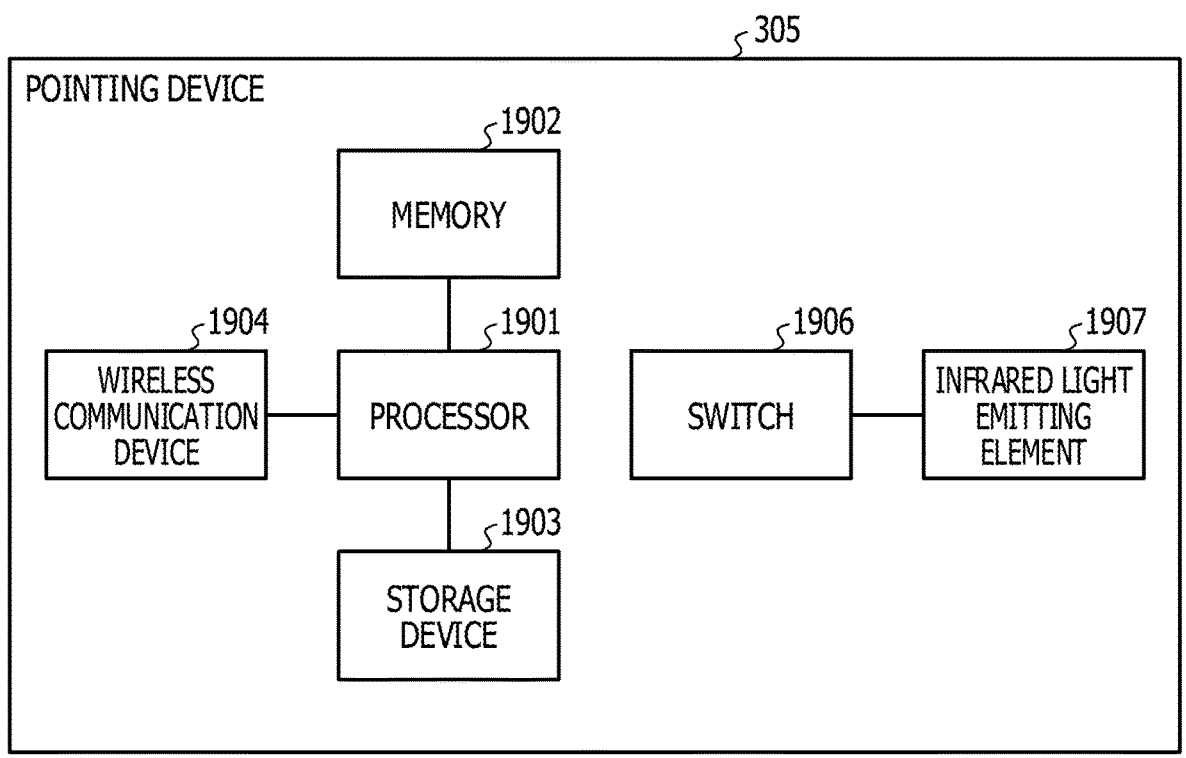
FIG. 19 illustrates an example of the hardware configuration of the pointing device according to the embodiment.

FIG. 19 illustrates an example of the hardware configuration of the pointing device 305 according to the embodiment. The hardware configuration for realizing the pointing device 305 in FIG. 19 includes, for example, a processor 1901, a memory 1902, a storage device 1903, a wireless communication device 1904, a switch 1906, and an infrared light projection element 1907. The memory 1902, the storage device 1903, and the wireless communication device 1904 may be connected, for example, with the processor 1901.

The processor may be, for example, a single processor, a multiprocessor, or a multicore. The processor 1901 executes a program using the memory 1902 so that the processor 1901 may provide the functions of the pointing device 305 described above.

The memory 1902 is, for example, a RAM. The storage device 1903 is, for example, a nonvolatile semiconductor memory such as a flash memory, or the like.

The wireless communication device 1904 may be, for example, a Wi-Fi communication device that communicates with the access point 320 and a Bluetooth (registered trademark) device that receives a beacon, or the like. The switch 1906, for example, changes ON and OFF of an infrared light projection element. The infrared light projection element, for example, projects infrared light when the switch 1906 is turned ON.

Each program according to the embodiments may be provided for the storage device 1803 and the storage device 1903, for example, in the following modes.

(1) installed in the storage device 1803 and the storage device 1903 in advance.

(2) provided from the removable storage medium 1805.

(3) provided from a server, such as a program server, or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method of a computer, the method comprising:

executing a first obtaining process that includes obtaining an image captured by an imaging device, the imaging device being configured to make a pointing device to be in the image, the pointing device including a wireless communication device, the wireless communication device being a device configured to output a radio wave including device information, the device information indicating the wireless communication device of the pointing device;

executing a identifying process that includes identifying a first position corresponding to the pointing device based on the obtained image;

executing a second obtaining process that includes obtaining radio wave reception information, wireless communication apparatus information, and the device information, the radio wave reception information indicating a reception state, by a wireless communication apparatus or a wireless communication device, of a radio wave transmitted and received between a wireless communication apparatus and a wireless communication device of the pointing device, the wireless communication apparatus information indicating the wireless communication apparatus;

executing an estimating process that includes estimating a second position corresponding the pointing device based on the obtained radio wave reception information and wireless communication apparatus information;

executing a calculating process that includes calculating a difference between the first position and the second position; and executing a storing process when the calculated difference is less than a threshold, the storing process including storing the obtained device information in association with the identified first position.

2. The control method according to claim 1,
wherein the second obtaining process is configured to receive the radio wave reception information, the wireless communication apparatus information, and the device information from the wireless communication device of the pointing device.

3. The control method according to claim 1,
wherein when positions of a plurality of pointing devices are identified based on the captured image at first time, and there are a plurality of the positions having a matching degree with the estimated position that satisfies a reference among the positions of the plurality of pointing devices, the storing process is configured to store one of the plurality of positions that satisfy the reference at the first time in association with the device information based on an estimation position at the second time estimated based on the radio wave reception information at second time different from the first time and specific positions of the plurality of pointing devices at the second time identified based on the captured image at the second time.

4. The control method according to claim 1,
wherein the storing process is configured to determine that the matching degree satisfies the condition when a distance between the first position and the second position is within a predetermined threshold value.

5. The control method according to claim 4,
wherein the storing process is configured to use a first threshold value as the predetermined threshold value when a number of the wireless communication apparatuses is less than or equal to a predetermined value, and
wherein the storing process is configured to use a second threshold value as the predetermined threshold value when the number of the wireless communication apparatuses is greater than the predetermined value, the second threshold value having a shorter distance than the first threshold value.

6. An information processing apparatus comprising:
a memory; and
a processor coupled to the memory, the processor being configured to
execute a first obtaining process that includes obtaining an image captured by an imaging device, the imaging device being configured to make a pointing device to be in the image, the pointing device including a wireless communication device, the wireless communication device being a device configured to output a radio wave including device information, the device information indicating the wireless communication device of the pointing device;
execute a identifying process that includes identifying a first position corresponding to the pointing device based on the obtained image;
execute a second obtaining process that includes obtaining radio wave reception information, wireless communication apparatus information, and the device information, the radio wave reception information indicating a reception state, by a wireless communication apparatus or a wireless communication device, of a radio wave transmitted and received between a wireless communication apparatus and a wireless communication device of the pointing device, the wireless communication apparatus information indicating the wireless communication apparatus;
execute an estimating process that includes estimating a second position corresponding the pointing device based on the obtained radio wave reception information and wireless communication apparatus information;
executing a calculating process that includes calculating a difference between the first position and the second position; and
execute a storing process when the calculated difference is less than a threshold, the storing process including storing the obtained device information in association with the identified first position.

7. The information processing apparatus according to claim 6,
wherein the second obtaining process is configured to receive the radio wave reception information, the wireless communication apparatus information, and the device information from the wireless communication device of the pointing device.

8. The information processing apparatus according to claim 6,
wherein when positions of a plurality of pointing devices are identified based on the captured image at first time, and there are a plurality of the positions having a matching degree with the estimated position that satisfies a reference among the positions of the plurality of pointing devices, the storing process is configured to store one of the plurality of positions that satisfy the reference at the first time in association with the device information based on an estimation position at the second time estimated based on the radio wave reception information at second time different from the first time and specific positions of the plurality of pointing devices at the second time identified based on the captured image at the second time.

9. The information processing apparatus according to claim 6,
wherein the storing process is configured to determine that the matching degree satisfies the condition when a distance between the first position and the second position is within a predetermined threshold value.

10. The information processing apparatus according to claim 9,
wherein the storing process is configured to use a first threshold value as the predetermined threshold value when a number of the wireless communication apparatuses is less than or equal to a predetermined value, and
wherein the storing process is configured to use a second threshold value as the predetermined threshold value when the number of the wireless communication apparatuses is greater than the predetermined value, the second threshold value having a shorter distance than the first threshold value.

11. A non-transitory computer-readable storage medium for storing a program which causes a processor to perform processing, the processing comprising:
executing a first obtaining process that includes obtaining an image captured by an imaging device, the imaging device being configured to make a pointing device to be in the image, the pointing device including a wireless communication device, the wireless communication device being a device configured to output a radio wave including device information, the device information indicating the wireless communication device of the pointing device;

executing a identifying process that includes identifying a first position corresponding to the pointing device based on the obtained image;

executing a second obtaining process that includes obtaining radio wave reception information, wireless communication apparatus information, and the device information, the radio wave reception information indicating a reception state, by a wireless communication apparatus or a wireless communication device, of a radio wave transmitted and received between a wireless communication apparatus and a wireless communication device of the pointing device, the wireless communication apparatus information indicating the wireless communication apparatus;

executing an estimating process that includes estimating a second position corresponding the pointing device based on the obtained radio wave reception information and wireless communication apparatus information;

executing a calculating process that includes calculating a difference between the first position and the second position; and executing a storing process when the calculated difference is less than a threshold, the storing process including storing the obtained device information in association with the identified first position.

12. The non-transitory computer-readable storage medium according to claim 11, wherein the second obtaining process is configured to receive the radio wave reception information, the wireless communication apparatus information, and the device information from the wireless communication device of the pointing device.

13. The non-transitory computer-readable storage medium according to claim 11, wherein when positions of a plurality of pointing devices are identified based on the captured image at first time, and there are a plurality of the positions having a matching degree with the estimated position that satisfies a reference among the positions of the plurality of pointing devices, the storing process is configured to store one of the plurality of positions that satisfy the reference at the first time in association with the device information based on an estimation position at the second time estimated based on the radio wave reception information at second time different from the first time and specific positions of the plurality of pointing devices at the second time identified based on the captured image at the second time.

14. The non-transitory computer-readable storage medium according to claim 11, wherein the storing process is configured to determine that the matching degree satisfies the condition when a distance between the first position and the second position is within a predetermined threshold value.

15. The non-transitory computer-readable storage medium according to claim 14, wherein the storing process is configured to use a first threshold value as the predetermined threshold value when a number of the wireless communication apparatuses is less than or equal to a predetermined value, and wherein the storing process is configured to use a second threshold value as the predetermined threshold value when the number of the wireless communication apparatuses is greater than the predetermined value, the second threshold value having a shorter distance than the first threshold value.

* * * * *